US008027484B2

(12) United States Patent
Yoshida et al.

(10) Patent No.: US 8,027,484 B2
(45) Date of Patent: Sep. 27, 2011

(54) ACTIVE VIBRATION NOISE CONTROLLER

(75) Inventors: Shigeki Yoshida, Mie (JP); Masahide Onishi, Osaka (JP); Yoshio Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 914 days.

(21) Appl. No.: 11/911,582

(22) PCT Filed: Jul. 7, 2006

(86) PCT No.: PCT/JP2006/313558
§ 371 (c)(1),
(2), (4) Date: Oct. 15, 2007

(87) PCT Pub. No.: WO2007/013281
PCT Pub. Date: Feb. 1, 2007

(65) Prior Publication Data

US 2009/0074198 A1 Mar. 19, 2009

(30) Foreign Application Priority Data

Jul. 27, 2005 (JP) ................................ 2005-216719

(51) Int. Cl.
*G10K 11/16* (2006.01)
*G10K 11/178* (2006.01)
*H04B 15/02* (2006.01)
*G10K 11/00* (2006.01)
*H04B 15/00* (2006.01)

(52) U.S. Cl. .................. 381/71.4; 381/71.2; 381/71.11; 381/86; 381/94.1

(58) Field of Classification Search ................ 381/71.4, 381/71.1, 71.2, 71.8, 71.11, 71.12, 86, 94.1, 381/94.9; 700/28; 379/406.01, 406.08, 406.09
See application file for complete search history.

(56) References Cited

U.S. PATENT DOCUMENTS 5,278,780 A * 1/1994 Eguchi .......................... 708/322
5,377,276 A * 12/1994 Terai et al. ................. 381/71.11
5,388,160 A * 2/1995 Hashimoto et al. ........ 381/71.14
5,488,667 A * 1/1996 Tamamura et al. .......... 381/71.4
5,586,190 A * 12/1996 Trantow et al. ............ 381/71.12
5,710,822 A * 1/1998 Steenhagen et al. ....... 381/71.12
6,418,228 B1 * 7/2002 Terai et al. .................. 381/71.8
(Continued)

FOREIGN PATENT DOCUMENTS

JP 01501344 * 5/1989
(Continued)

OTHER PUBLICATIONS

International Search Report for Publication No. PCT/JP2006/313558 dated Sep. 19, 2006.

*Primary Examiner* — Edgardo San Martin
(74) *Attorney, Agent, or Firm* — RatnerPrestia

(57) ABSTRACT

Microphone is arranged at an evaluation point at the front seat; a signal for controlling vibration noise at this position is sent out from speaker at the front seat; secondary sound for canceling an influence of secondary sound at the front seat on the rear seat is sent out from speaker at the rear seat; microphone is arranged at an evaluation point at the rear seat; a signal for controlling vibration noise at this position is sent out from speaker; and secondary sound for canceling an influence of secondary sound at the rear seat on the front seat is sent out from speaker at the front seat.

1 Claim, 4 Drawing Sheets

U.S. PATENT DOCUMENTS

| | | | | |
|---|---|---|---|---|
| 7,340,065 | B2 * | 3/2008 | Nakamura et al. | 381/71.11 |
| 7,352,869 | B2 * | 4/2008 | Inoue et al. | 381/71.11 |
| 7,536,018 | B2 * | 5/2009 | Onishi et al. | 381/71.8 |
| 7,574,006 | B2 * | 8/2009 | Funayama et al. | 381/71.12 |
| 7,620,188 | B2 * | 11/2009 | Inoue et al. | 381/71.4 |
| 7,775,320 | B2 * | 8/2010 | McCain et al. | 181/206 |
| 2007/0071253 | A1 * | 3/2007 | Sato et al. | 381/94.3 |
| 2008/0152158 | A1 * | 6/2008 | Sakamoto et al. | 381/71.4 |
| 2008/0192948 | A1 * | 8/2008 | Kan et al. | 381/71.4 |
| 2009/0279710 | A1 * | 11/2009 | Onishi et al. | 381/71.4 |

FOREIGN PATENT DOCUMENTS

| | | | | |
|---|---|---|---|---|
| JP | 04-194996 | A | | 7/1992 |
| JP | 04-251898 | A | | 9/1992 |
| JP | 06332477 | A | * | 12/1994 |
| JP | 2005-084500 | | | 3/2005 |
| WO | WO 88/02912 | | * | 4/1988 |

* cited by examiner

ACTIVE VIBRATION NOISE CONTROLLER

TECHNICAL FIELD

The present invention relates to an active vibration noise controller that performs controls to reduce noise owing to mutual interference by outputting secondary sound for canceling noise occurring in an environment such as in the cabin of an automobile or aircraft.

BACKGROUND ART

Japanese Patent Unexamined Publication No. 2005-084500 discloses a conventional active vibration noise controller that is equipped with multiple speakers as a secondary sound generator, and microphones as an error signal detector, in an enclosed space such as in an automobile cabin; and suppresses noise at a position spaced from the microphones, using a compensating filter to actively reduce noise at a simulated evaluation point.

The conventional apparatus uses multiple speakers 11, 12 as a secondary sound generator, as shown in FIG. 4. The filter coefficient of adaptive filter 14 is successively updated so as to minimize an error signal detected by microphone 13 as an evaluation point, owing to the secondary sound from speaker 11 at the front seat and from speaker 12 at the rear seat, allowing optimal performance of vibration noise suppression to be achieved at an evaluation point.

Further, the filter coefficient of compensating filter 15 is determined according to the ratio of the transmission characteristic from speaker 11 at the front seat to a simulated evaluation point positioned where is spaced from microphone 13; to the transmission characteristic from speaker 12 at the rear seat to the simulated evaluation point. Consequently, at the simulated evaluation point at the rear seat, secondary sound from speaker 11 at the front seat can be cancelled by that from speaker 12 at the rear seat, and thus speaker 11 at the front seat suppresses vibration or noise occurring at the simulated evaluation point at the rear seat.

However, secondary sound supplied from speaker 12 at the rear seat through compensating filter 15 only cancels the effect of an output signal from speaker 11 at the front seat on the simulated evaluation point, at the simulated evaluation point. That is, at the simulated evaluation point, residual vibration noise, namely an error signal, is not detected due to absence of an error signal detector such as a microphone, and thus noise change is not followed at the simulated evaluation point. Consequently, effective noise reduction is not achieved at the simulated evaluation point when the transmission characteristic from the speaker to the simulated evaluation point changes due to changes of the speaker characteristic or to opening/closing of a window.

SUMMARY OF THE INVENTION

An active vibration noise controller of the present invention is composed of a reference signal generator that generates a harmonic reference signal selected from the frequencies of noise occurred from a noise source of an engine or the like; a first adaptive filter that outputs a first control signal according to the reference signal; a second adaptive filter that outputs a second control signal according to the reference signal; a first secondary sound generator that generates secondary sound for canceling noise according to the first control signal; a second secondary sound generator that generates secondary sound for canceling noise according to the second control signal; first and second error signal detectors that detect the result of interference between the secondary sound and the noise; a first correction filter that processes the reference signal using a characteristic simulating the transmission characteristic from the first secondary sound generator to the first error signal detector, and outputs a first referencing signal; a second correction filter that processes the reference signal using a characteristic simulating the transmission characteristic from the second secondary sound generator to the second error signal detector, and outputs a second referencing signal; a first filter coefficient updater that updates the coefficient of the first adaptive filter according to the first referencing signal and the error signal from the first error signal detector; and a second filter coefficient updater that updates the coefficient of the second adaptive filter according to the second referencing signal and the error signal from the second error signal detector. The active vibration noise controller is further equipped with first and second compensating filters that correct first and second control signals with respective filter coefficients, and output first and second compensating signals, respectively. The first secondary sound generator outputs a sum of the first control signal supplied from the first adaptive filter, and the second compensating signal that is supplied from the second adaptive filter and is corrected by the second compensating filter. The second secondary sound generator outputs a sum of the second control signal supplied from the second adaptive filter, and the first compensating signal that is supplied from the first adaptive filter and is corrected by the first compensating filter. The filter coefficient of the first compensating filter is determined according to the ratio of the transmission characteristic from the first secondary sound generator to the second error signal detector; to the transmission characteristic from the second secondary sound generator to the second error signal detector. The filter coefficient of the second compensating filter is determined according to the ratio of the transmission characteristic from the second secondary sound generator to the first error signal detector; to the transmission characteristic from the first secondary sound generator to the first error signal detector.

Such makeup enables vibration or noise to be reduced over the entire enclosed space such as an automobile cabin. Further, vibration or noise can be reduced accordingly thereto even if the transmission characteristic from the secondary sound generator to the error signal detector changes.

REFERENCE MARKS IN THE DRAWINGS

101, 102 Microphone (error signal detector)
103, 104 Speaker (secondary sound generator)
105*a*, 105*b* Correction filter
106 Controller
107*a*, 107*b* Reference signal generator

108*a*, 108*b* Adaptive filter
109*a*, 109*b* Compensating filter
110 Engine ECU
111*a*, 111*b* Filter coefficient updater
112 Automobile
113 Cabin
120 Cosine wave generator
121 Sine wave generator

DETAILED DESCRIPTION OF PREFERRED EMBODIMENTS

Hereinafter, a description is made for embodiments of the present invention using related drawings.

First Exemplary Embodiment

Figure 1:
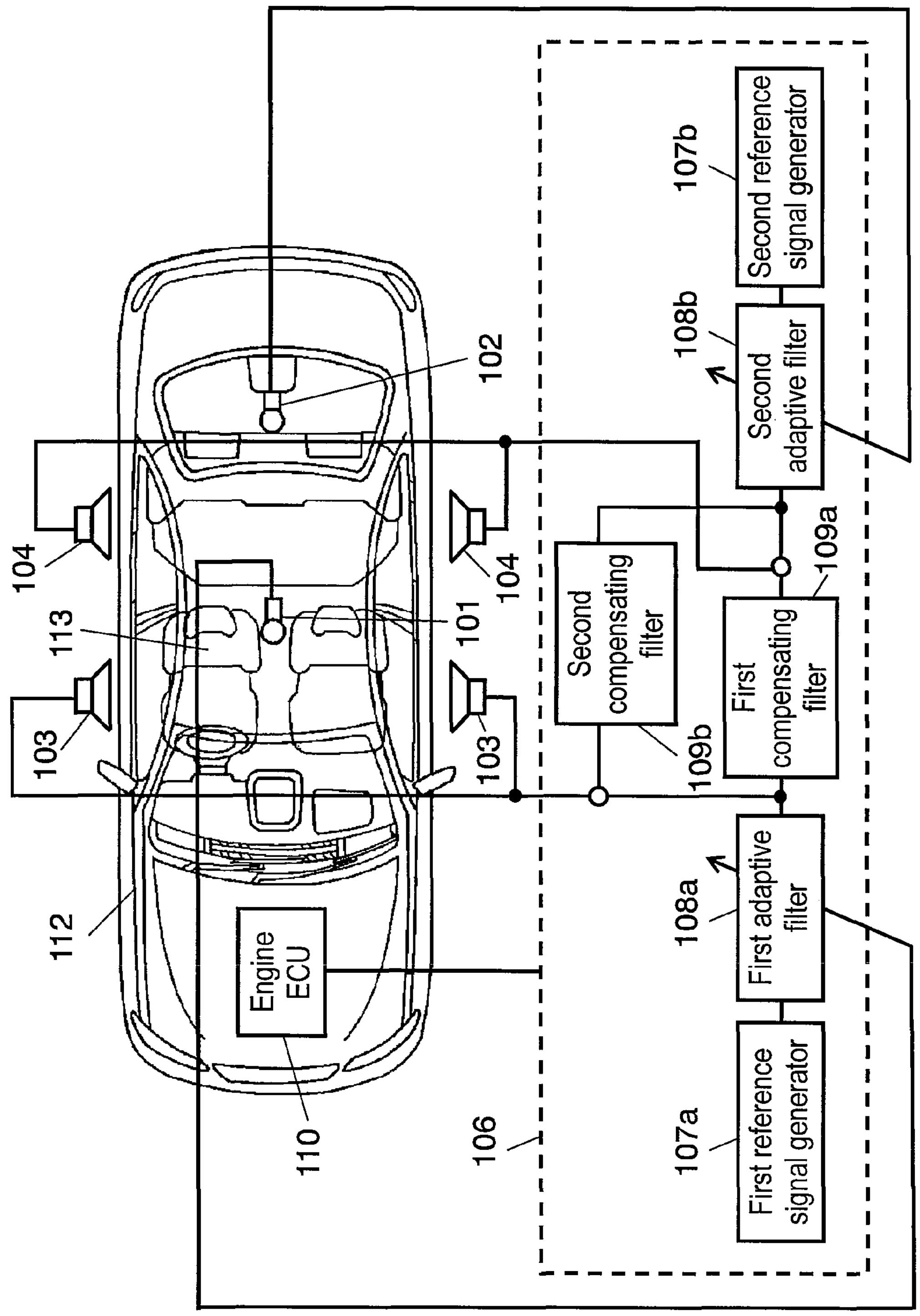
FIG. 1 is a schematic diagram illustrating the makeup of an active vibration noise controller according to the first exemplary embodiment of the present invention, where the diagram is a plan view in a state mounted on a vehicle.

FIG. 1 is a schematic diagram illustrating the makeup of an active vibration noise controller according to the first exemplary embodiment of the present invention, where the diagram is a plan view in a state mounted on a vehicle. The forward part of automobile 112 is loaded with a 4-cylinder 4-cycle internal combustion engine ("internal combustion engine" is referred to as "engine" hereinafter) using gasoline as its fuel. An engine is the major noise source in the vehicle. Cabin 113 has an active vibration noise controller loaded therein. The active vibration noise controller according to the embodiment is equipped with controller 106; a secondary sound generator composed of two sets of speakers 103, 104; and an error signal detector composed of two microphones 101, 102.

As shown in the figure, the active vibration noise controller is equipped with controller 106; a set of speakers 103 as a first secondary sound generator, stored in the door panels at both sides of the front seat; a set of speakers 104 as a second secondary sound generator, stored in the door panels at both sides of the rear seat; microphone 101 as a first error signal detector, buried in the roof at a position directly above the center of the front seat; and microphone 102 as a second error signal detector, buried in the roof at a position directly above the center of the rear seat. Controller 106, a kind of microcomputer, includes a CPU, memory, counter (not illustrated).

The engine has an engine electric control unit (referred to as "engine ECU" hereinafter) 110 connected thereto. NE pulses, a pulse signal indicating the number of engine revolutions, are generated from ignition signals, to be sent out to controller 106. Controller 106 generates from a pulse signal having been input, a harmonic frequency selected from the number of engine revolutions, such as a second harmonic, as a reference signal.

A predominant factor of in-cabin noise is muffled sound, which is radiated sound caused by engine vibration generated from gas combustion in the engine cylinder that transmits to the automobile body to excite the panels of the automobile body. Usually, the frequency of muffled sound is roughly twice the number of engine revolutions for a 4-cylinder engine, and three times for a 6-cylinder engine. The frequency of muffled sound thus varies depending on the number of cylinders and is based on harmonics of the number of engine revolutions. Muffled sound mainly caused by an engine is synchronized with the engine revolution, and thus the cycle of the reference signal is determined according to a pulse signal generated from engine ECU 110 mounted on the automobile.

Figure 2:
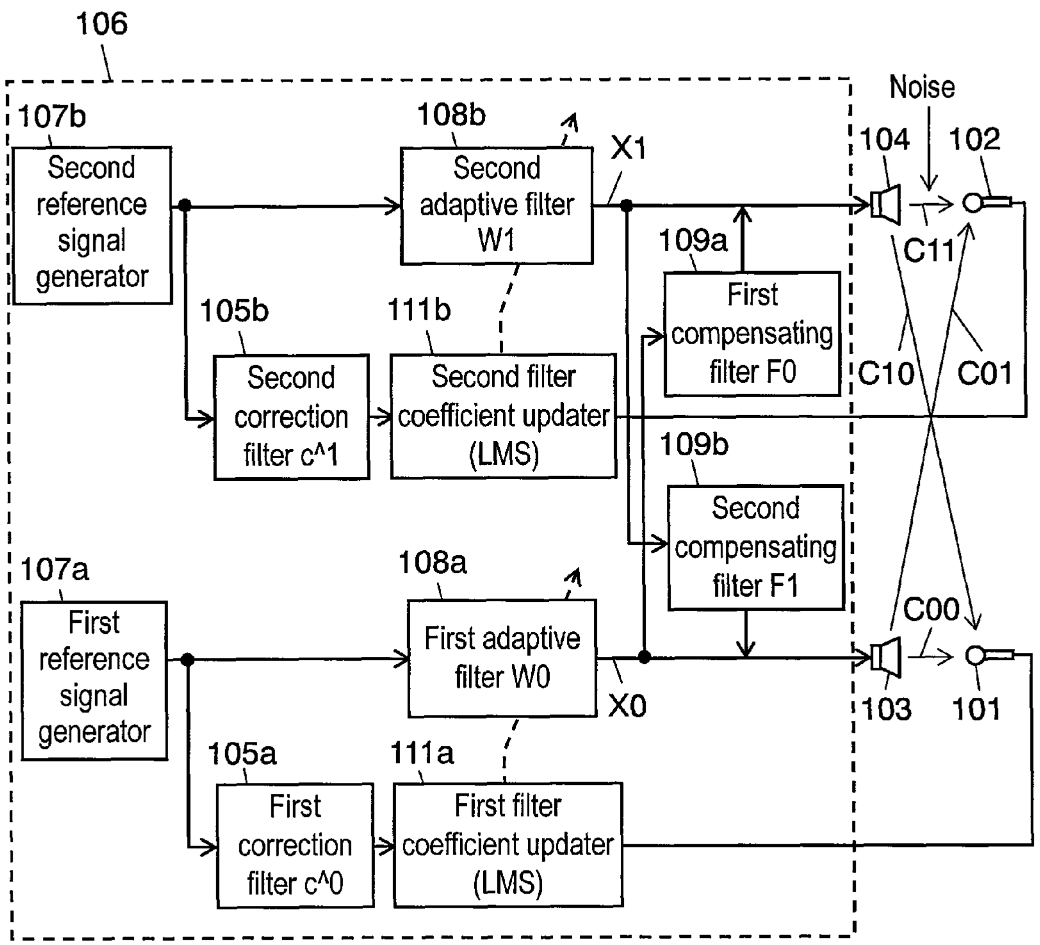
FIG. 2 is a block diagram illustrating an example of the makeup of the active vibration noise controller according to the first embodiment of the present invention.

FIG. 2 is a block diagram illustrating an example of the makeup of the active vibration noise controller according to the first embodiment of the present invention.

As shown in the figure, the active vibration noise controller is equipped with controller 106; one set of speakers 103 as a first secondary sound generator; one set of speakers 104 as a second secondary sound generator; microphone 101 as a first error signal detector; and microphone 102 as a second error signal detector.

Controller 106 includes first reference signal generator 107*a* for generating a first reference signal and second reference signal generator 107*b* for generating a second reference signal, both according to an input signal from engine ECU 110; first adaptive filter 108*a* into which a first reference signal supplied from first reference signal generator 107*a* is input and from which first control signal X0 is output to speaker 103; second adaptive filter 108*b* into which a second reference signal supplied from second reference signal generator 107*b* is input and from which second control signal X1 is output to speaker 104; first compensating filter 109*a* into which first control signal X0 is input and from which a first compensating signal is output; second compensating filter 109*b* into which first control signal X1 is input and from which a second compensating signal is output; first correction filter 105*a* into which a first reference signal is input and from which a first referencing signal is output; second correction filter 105*b* into which a second reference signal is input and from which a second referencing signal is output; first filter coefficient updater 111*a* that updates the coefficient of first adaptive filter 108*a* according to the first referencing signal and an error signal from microphone 101; and second filter coefficient updater 111*b* that updates the coefficient of second adaptive filter 108*b* according to the second referencing signal and an error signal from microphone 102.

Next, a description is made for the active vibration noise controller according to the embodiment, with the above makeup.

Engine pulses, which is an electric signal synchronized with engine revolution, are input into controller 106 from engine ECU 110. Then, controller 106 determines the frequencies of the first and second reference signals to be output by reference signal generators 107*a*, 107*b* according to the signal, namely the frequency of in-cabin noise to be reduced. These reference signals may be identical. Engine pulses may be counted with an output signal supplied from a top dead center sensor (referred to as "TDC sensor" hereinafter), or with tachopulse output. Tachopulse output especially is often available on the vehicle as an input signal for a tachometer, thus usually dispensing with a special device provided.

The first reference signal is multiplied by filter coefficient W0 of first adaptive filter 108*a* to become first control signal X0, which is then amplified by a signal amplifier (not illustrated). Next, first control signal X0 is input to speaker 103 as a first secondary sound generator and is radiated from speaker 103 as secondary sound for reducing noise at an evaluation point where microphone 101 as a first error signal detector is placed.

In the same way, the second reference signal is multiplied by filter coefficient W1 of second adaptive filter 108*b* to become second control signal X1, which is then amplified by a signal amplifier (not illustrated). Next, second control signal X1 is input to speaker 104 as a second secondary sound generator and is radiated from speaker 104 as secondary sound for reducing noise at an evaluation point where microphone 102 as a second error signal detector is placed.

Meanwhile, first control signal X0 is multiplied by filter coefficient F0 of first compensating filter 109*a* to become a first compensating signal, added to second control signal X1, and amplified by a signal amplifier (not illustrated). Then, the first compensating signal is input to speaker 104 as a second secondary sound generator and is radiated from speaker 104 as secondary sound for compensating unnecessary secondary sound generated due to an influence of secondary sound supplied from speaker 103 on microphone 102 as an evaluation point, namely due to path C01 shown in FIG. 2.

In the same way, second control signal X1 is multiplied by filter coefficient F1 of second compensating filter 109*b* to become a second compensating signal, added to first control signal X0, and amplified by a signal amplifier (not illustrated). Then, the second compensating signal is input to speaker 103 as a first secondary sound generator and is radiated from speaker 103 as secondary sound for compensating unnecessary secondary sound generated due to an influence of secondary sound supplied from speaker 104 on microphone 101 as an evaluation point, namely due to path C10 shown in FIG. 2.

Microphones 101, 102, connected to controller 106 through a cable, detect noise and send the detection value to controller 106. According to the input values, controller 106 uses first and second adaptive filters 108*a*, 108*b*, and first and second compensating filters 109*a*, 109*b* to calculate first and second control signals X0, X1 so as to reduce the noise. Then, first and second control signals X0, X1 are converted to drive signals for two sets of speakers 103, 104, respectively. Secondary sound for compensating noise is output from two sets of speakers 103, 104 through a cable. In this case, two speakers 103 at the front seat are driven by the same drive signal, and two speakers 104 at the rear seat are driven by the same drive signal as well. Four speakers 103, 104 double as those for the in-car audio system.

Next, a description is made for the operation of first and second correction filters 105*a*, 105*b*. As shown in FIG. 2, the assumption is made that the filter coefficient of first correction filter 105*a* is c^0; that of second correction filter 105*b* is c^1; the transmission characteristic from speaker 103 at the front seat to microphone 101 at the front seat is C00; that from speaker 103 at the front seat to microphone 102 at the rear seat is C01; that from speaker 104 at the rear seat to microphone 101 at the front seat is C10; and that from speaker 104 at the rear seat to microphone 102 at the rear seat is C11.

As described above, by determining the transmission characteristics for each makeup, secondary sound Y0 from speaker 103 at the front seat when reaching microphone 101 at the front seat is expressed by Y0=(X0+F1*X1)*C00. Secondary sound Y1 from speaker 104 at the rear seat when reaching microphone 101 at the front seat is as well expressed by Y1=(X1+F0*X0)*C10.

Secondary sound Y3 from speaker 103 at the front seat when reaching microphone 102 at the rear seat is expressed by Y3=(X0+F1*X1)*C01. Secondary sound Y4 from speaker 104 at the rear seat when reaching microphone 102 at the rear seat is as well expressed by Y4=(X1+F0*X0)*C11.

First filter coefficient updater 111*a* is supplied with a signal with each secondary sound described above added thereto by microphone 101, and thus input signal (Y0+Y1) to first filter coefficient updater 111*a* is expressed by the following expression.

$$\begin{aligned} Y0+Y1 &= (X0+X1*F1)*C00+(X1+X0*F0)*C10 \quad (1)\\ &= (C00+F0*C10)*X0+(C10+F1*C00)*X1 \end{aligned}$$

Here, filter coefficient c^0 of first correction filter 105*a* is designed so as to represent the transmission characteristic from output X0 of first adaptive filter 108*a* to first filter coefficient updater 111*a*, in order to gradually reduce noise at microphone 101. When filter coefficient c^0 is thus defined, filter coefficient c^0 of first correction filter 105*a* affects only the terms to which first control signal X0 contributes, and thus is expressed by the following.

$$c\hat{}0=(C00+F0*C10) \quad (2)$$

In the same way, second filter coefficient updater 111*b* is supplied with a signal with each secondary sound described above added thereto by microphone 102, and thus input signal (Y3+Y4) to second filter coefficient updater 111*b* is expressed by the following expression.

$$Y3+Y4=(C01+F0*C11)*X0+(C11+F1*C01)*X1 \quad (3)$$

Here, in the same way, filter coefficient c^1 of second correction filter 105*b* is designed so as to represent the transmission characteristic from output X1 of second adaptive filter 108*b* to second filter coefficient updater 111*b*, in order to gradually reduce noise at microphone 102. When filter coefficient c^1 is thus defined, filter coefficient c^1 of second correction filter 105*b* affects only the terms to which second control signal X1 contributes, and thus is expressed by the following.

$$c\hat{}1=C11+F1*C01 \quad (4)$$

Herewith, the active vibration noise controller according to the embodiment is designed so that the correction value of first correction filter 105*a* is to be the sum (C00+F0*C10), where C00 is the transmission characteristic from speaker 103 at the front seat to microphone 101 at the front seat; F0 is the filter coefficient of compensating filter 109*a*; and C10 is the transmission characteristic from speaker 104 at the rear seat to microphone 101 at the front seat. In addition, the correction value of second correction filter 105*b* is to be the sum (C11+F1*C01), where C11 is the transmission characteristic from speaker 104 at the rear seat to microphone 102 at the rear seat; F1 is the filter coefficient of compensating filter 109*b*; and C01 is the transmission characteristic from speaker 103 at the front seat to microphone 102 at the rear seat.

Then, the active vibration noise controller according to the embodiment arranges microphone 101 as a first error signal detector, at an evaluation point at the front seat; sends out a signal for controlling vibration noise at this position, from speaker 103 at the front seat; sends out secondary sound for canceling an influence of secondary sound at the front seat on the rear seat, from speaker 104 at the rear seat; arranges microphone 102 as a second error signal detector, at an evaluation point at the rear seat; sends out a signal for controlling vibration noise at this position, from speaker 104 at the rear seat; and sends out secondary sound for canceling an influence of secondary sound at the rear seat on the front seat, from speaker 103 at the front seat.

In order to operate the active vibration noise controller in this way, filter coefficients F0, F1 of compensating filters 109*a*, 109*b* are designed to satisfy the following expressions (5) and (6).

$$C01=-C11*F0 \quad (5)$$

$$C10=-C00*F \quad (6)$$

By thus designing compensating filters 109*a*, 109*b*, expressions (1) and (3) are expressed as follows:

$$\begin{aligned} Y0+Y1 &= (C00+F0*C10)*X0 \quad (7)\\ &= c\hat{}0*X0 \end{aligned}$$

$$\begin{aligned} Y3+Y4 &= (C11+F1*C01)*X1 \quad (8)\\ &= c\hat{}1*X1 \end{aligned}$$

As these expressions (7), (8) show, signal (Y0+Y1) fed from microphone 101 into first filter coefficient updater 111*a* is to be changed only by first control signal X0. Signal (Y3+Y4) fed from microphone 102 into second filter coefficient updater 111*b* is as well to be changed only by second control signal X1. Consequently, by designing compensating filters 109*a*, 109*b* as described above, noise occurring at the rear seat is suppressed when reducing noise at the front seat, and vice versa.

As described above, in the active vibration noise controller according to the embodiment, filter coefficient F0 of first compensating filter 109*a* is obtained according to the ratio of transmission characteristic C01 from speaker 103 as a first secondary sound generator, to microphone 102 as a second error signal detector; to transmission characteristic C11 from speaker 104 as a second secondary sound generator, to microphone 102 as a second error signal detector. Meanwhile, filter coefficient F1 of second compensating filter 109*b* is obtained according to the ratio of transmission characteristic C10 from speaker 104 as a second secondary sound generator, to microphone 101 as a first error signal detector; to transmission characteristic C00 from speaker 103 as a first secondary sound generator, to microphone 101 as a first error signal detector.

Meanwhile, filter coefficient W0 of first adaptive filter 108*a* is updated successively by first filter coefficient updater 111*a*, according to a first referencing signal supplied from first correction filter 105*a* and an error signal supplied from microphone 101. Further, filter coefficient W1 of second adaptive filter 108*b* is updated successively by second filter coefficient updater 111*b*, according to a second referencing signal supplied from second correction filter 105*b* and an error signal supplied from microphone 102. In this embodiment, filter coefficients W0, W1 are updated using LMS (least mean square), a kind of steepest descent method, as a general algorithm for a filter coefficient updater. The assumption is made that a first referencing signal as an output from first correction filter 105*a* is r0; a second referencing signal as an output from second correction filter 105*b* is r1; an error signal obtained from microphone 101 is e0; an error signal obtained from microphone 102 is e1; and a step size parameter as a minute value used by the LMS is μ. Then, filter coefficients W0($n$+1) and W1($n$+1) are expressed recursively as shown in expressions (9) and (10).

$$W0(n+1)=W0(n)-\mu*e0(n)*r0(n) \tag{9}$$

$$W1(n+1)=W1(n)-\mu*e1(n)*r1(n) \tag{10}$$

In this way, filter coefficients W0, W1 can be converged to optimum values recursively according to adaptive control so that error signals e0, e1 become smaller, in other words, the noise at microphones 101, 102 as noise suppressors is reduced.

As described above, the active vibration noise controller according to the embodiment reduces noise accordingly to its changes even if the transmission characteristics from speakers 103, 104 to microphones 101, 102 change, respectively. Vibration noise is reduced not only at the front seat but also in the entire cabin (front and rear seats).

The active vibration noise controller according to the embodiment is equipped with two secondary sound generators and two error signal detectors. However, the controller may have three each of them. This makeup allows reducing noise accordingly to its changes even if the transmission characteristics change between the secondary sound generators and the error signal detectors, respectively. Consequently, noise is reduced over a wider range.

Second Exemplary Embodiment

Figure 3:
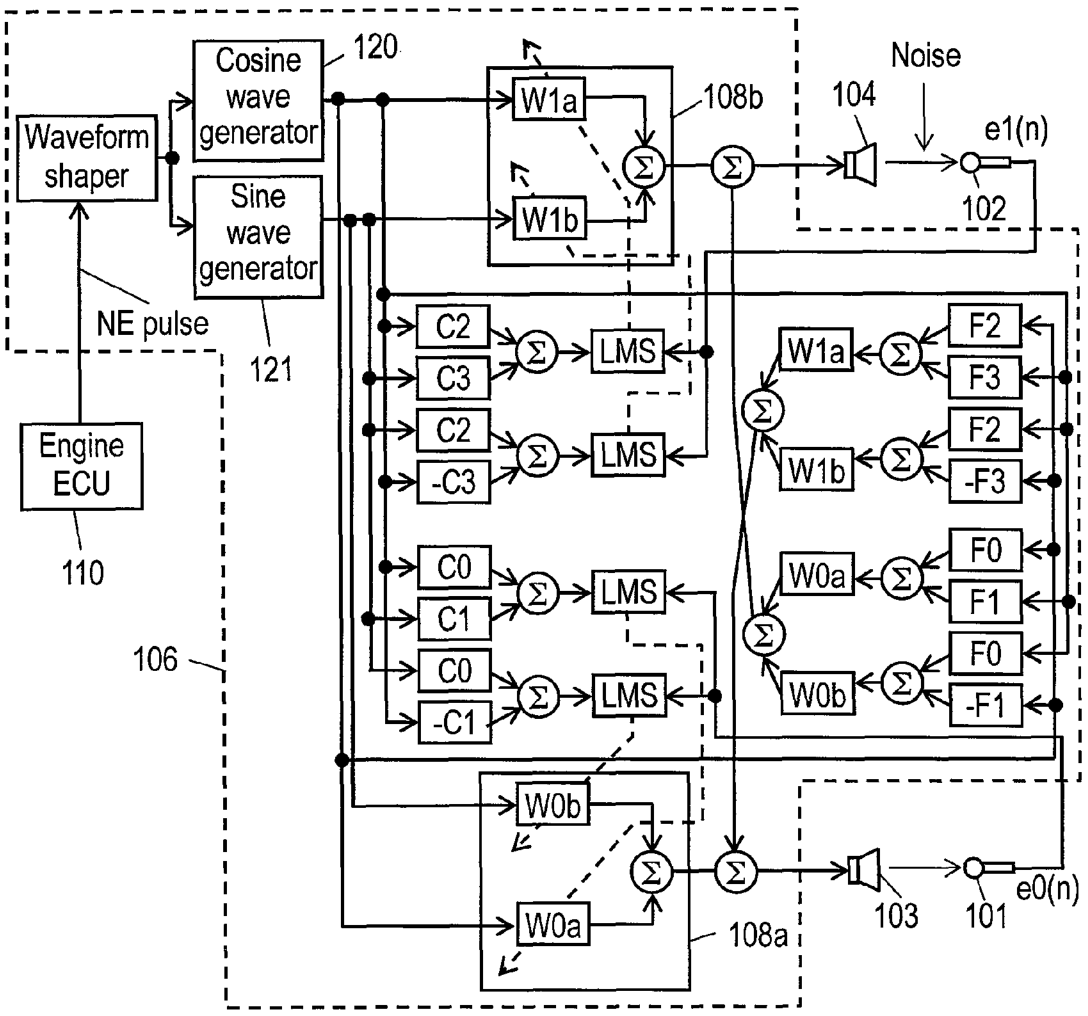
FIG. 3 is a block diagram illustrating an example of the makeup of an SAN (single-frequency adaptive notch)-type active vibration noise controller according to the second exemplary embodiment of the present invention.
Figure 4:
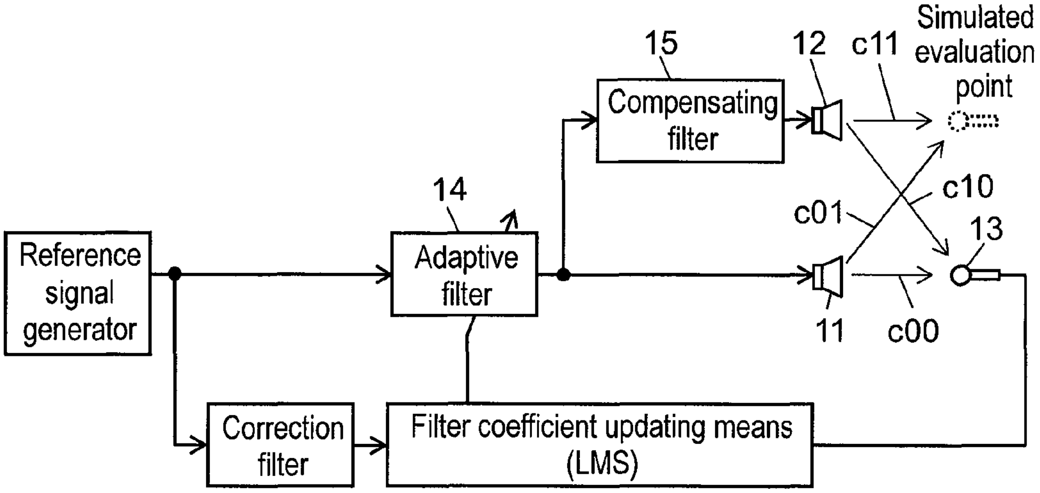
FIG. 4 is a block diagram illustrating the makeup of a conventional active vibration noise controller.

A description is made for an active vibration noise controller according to the second exemplary embodiment of the present invention. The controller according to the embodiment stores in the memory the filter coefficients of the correction filter and compensating filter preliminarily determined on a frequency-by-frequency basis, and allows free retrieval according to the frequency of the reference signal. FIG. 3 illustrates the same makeup as that in FIG. 2 except that the reference signal is drawn in a state decomposed into cosine and sine waves.

FIG. 3 is a block diagram illustrating the makeup of the active vibration noise controller according to the embodiment. As shown in the figure, NE pulses are sent out from engine ECU 110 to controller 106. The muffled sound, synchronized with the engine revolution, has a narrow frequency band, in other words, a waveform similar to a sine wave, and thus the muffled sound with the frequency can be expressed by a sum of sine and cosine Waves. That is, a reference signal generated according to engine ECU 110 corresponding to muffled sound expressed by a sum of sine and cosine waves is as well generated in a state decomposed into cosine and sine waves.

As shown in FIG. 3, a cosine wave component of a reference signal supplied from cosine wave generator 120, and a sine wave component supplied from sine wave generator 121 are multiplied by coefficients C0, C1, C2, C3 of the signal transmission characteristics, respectively, as shown in FIG. 3, and added by an adder to generate a referencing signal. The referencing signal is multiplied by error signals e0($n$), e1($n$) and step size μ, and the resulting product is subtracted from the this time values of filter coefficients W0*a*, W0*b*, W1*a*, W1*b* of adaptive filters 108*a*, 108*b*, to calculate the next time values of W0*a*, W0*b*, W1*a*, W1*b* (refer to expressions (9), (10)).

Outputs from adaptive filters 108*a*, 108*b* are added by an adder and output from speakers 103, 104 as a secondary sound generator, respectively. For a compensating signal, its sine and cosine waves are multiplied by coefficients F0, F1, F2, F3 of the compensating filter as shown in FIG. 3 and added by an adder, respectively.

With such makeup, the active vibration noise controller according to the embodiment reduces noise accordingly to its changes even if the transmission characteristics from speakers 103, 104 to microphones 101, 102 change, respectively. Vibration noise is reduced not only at the front seat but also in the entire cabin (front and rear seats).

Here, this method utilizes a notch filter used to remove muffled sound with a narrow-band frequency for adaptive control algorithm and makes filter coefficients W0*a*, W0*b* and W1*a*, W1*b* corresponding to the coefficient of an orthogonal signal follow changes of the number of engine revolutions, by means of digital signal processing, which is called SAN (single-frequency adaptive notch). Such makeup allows reducing the load on the operating unit, and thus is implemented with an inexpensive microprocessor chip or the like, not with an expensive DSP.

INDUSTRIAL APPLICABILITY

An active vibration noise controller of the present invention uses multiple speakers as a secondary sound output unit, and multiple microphones as an error signal detector to reduce vibration noise not in a part of the cabin but in the entire cabin including front and rear seats, which is usefully applicable to an automobile and the like.

The invention claimed is:

1. An active vibration noise controller comprising:

a reference signal generator for generating a harmonic reference signal selected from frequencies of noise occurred from a noise source;

a first adaptive filter for outputting a first control signal according to the reference signal;

a second adaptive filter for outputting a second control signal according to the reference signal;

a first secondary sound generator for generating secondary sound for canceling the noise according to the first control signal;

a second secondary sound generator for generating secondary sound for canceling the noise according to the second control signal;

a first error signal detector and a second error signal detector for detecting a result of interference between the secondary sound and the noise, as an error signal;

a first correction filter that processes the reference signal with a characteristic simulating a transmission characteristic from the first secondary sound generator to the first error signal detector, and outputs a first referencing signal;

a second correction filter that processes the reference signal with a characteristic simulating a transmission characteristic from the second secondary sound generator to the second error signal detector, and outputs a second referencing signal;

a first filter coefficient updater for updating a coefficient of the first adaptive filter according to the first referencing signal and the error signal from the first error signal detector; and a second filter coefficient updater for updating a coefficient of the second adaptive filter according to the second referencing signal and the error signal from the second error signal detector, wherein the active vibration noise controller includes a first compensating filter and a second compensating filter that correct the first control signal and the second control signal with respective filter coefficients, and output a first compensating signal and a second compensating signal, wherein the first secondary sound generator outputs a sum of the first control signal supplied from the first adaptive filter, and the second compensating signal supplied from the second adaptive filter and corrected by the second compensating filter, wherein the second secondary sound generator outputs a sum of the second control signal supplied from the second adaptive filter, and the first compensating signal supplied from the first adaptive filter and corrected by the first compensating filter, wherein a filter coefficient of the first compensating filter is obtained according to a ratio of a transmission characteristic from the first secondary sound generator to the second error signal detector, to a transmission characteristic from the second secondary sound generator to the second error signal detector, and wherein a filter coefficient of the second compensating filter is obtained according to a ratio of a transmission characteristic from the second secondary sound generator to the first error signal detector, to a transmission characteristic from the first secondary sound generator to the first error signal detector.

* * * * *